United States Patent [19]

Nishizaki et al.

[11] Patent Number: 5,034,508

[45] Date of Patent: Jul. 23, 1991

[54] DISPERSANT FOR NONAQUEOUS SYSTEMS

[75] Inventors: Shoichi Nishizaki, Shiga; Tominobu Mayuzumi, Kyoto, both of Japan

[73] Assignee: Dai-Ichi Kogyo Seiyaku Co., Ltd., Kyoto, Japan

[21] Appl. No.: 398,208

[22] Filed: Aug. 24, 1989

[30] Foreign Application Priority Data

Aug. 31, 1988 [JP] Japan .................................. 63-217540
Nov. 7, 1988 [JP] Japan .................................. 63-280872

[51] Int. Cl.$^5$ ........................ C08G 65/26; C09C 3/10; C09D 17/00
[52] U.S. Cl. .................................... 528/408; 524/612; 106/287.26; 252/174.21; 564/505; 528/405
[58] Field of Search ................. 528/405, 408; 564/505; 524/612

[56] References Cited

U.S. PATENT DOCUMENTS

| | | | |
|---|---|---|---|
| 2,792,369 | 5/1957 | Dickson | 564/505 X |
| 2,792,370 | 5/1957 | Dickson | 564/505 X |
| 2,792,371 | 5/1957 | Dickson | 564/505 X |
| 2,792,372 | 5/1957 | Dickson | 564/505 X |
| 2,979,528 | 4/1961 | Lundsted | 564/505 |
| 3,036,118 | 5/1962 | Jackson et al. | 564/505 X |
| 4,389,219 | 6/1983 | Naka et al. | 564/505 X |

*Primary Examiner*—Earl Nielsen
*Attorney, Agent, or Firm*—Jordan and Hamburg

[57] ABSTRACT

The present invention relates to a dispersant for nonaqueous systems which can disperse insoluble fine powders in nonaqueous liquids in a short period of time and give long-term dispersion stability to the resulting dispersions without allowing the formation of a so-called hard cake. The dispersant consists essentially of at least one polyether compound derived from at least one member of the class consisting of polyamine compounds having 5 to 300 active hydrogen atoms per molecule, polyalkylenimine compounds having 5 to 300 active hydrogen atoms per molecule, and derivatives thereof having 5 to 300 active hydrogen atoms per molecule by addition of at least one of ethylene oxide and propylene oxide and at least one alpha-olefin oxide containing 4 to 30 carbon atoms. The polyether compound has a molecular weight of 1,000 to 1,000,000. The dispersant has a favorable constitution resulting from well-balanced and efficient addition of hydrophobic and hydrophilic alkylene oxides and can disperse different fine powders in various nonaqueous liquids in a short period of time. The dispersions obtained show good storage stability for a prolonged period of time. The invention thus greatly contributes to the technical advancement in the field of nonaqueous fine powder dispersions.

12 Claims, No Drawings

DISPERSANT FOR NONAQUEOUS SYSTEMS

BACKGROUND OF THE INVENTION

This invention relates to a class of dispersants for nonaqueous systems which can disperse insoluble fine powders in nonaqueous liquids within a short period of time and thereby give dispersions showing good dispersion stability for a prolonged period of time without forming a so-called hard cake.

Furthermore, the invention relates to dispersants which, when fine pigments insoluble in organic liquids are dispersed in said organic liquids in the presence thereof, can provide dispersions particularly excellent in flowability and dispersion stability.

Nonaqueous fine powder dispersions are used in various fields of industry. In the fields of paints, pigments and printing inks, for instance, dispersion of pigments or paint components forms an important basic technology and surfactants are used for dispersibility improvement. Since pigments, resins and solvents have become diversified, pigments are reduced to fine powders and various dispersants are used selectively for various solvents.

In addition, commodity products which are essentially dispersions of fine powders, such as lubricants, metal powders, abrasives, fillers, extenders, sintering agents, electric conductors, pulverized solid fuels, agrochemicals, disperse dyes and microbicides, in nonaqueous liquids have been developed or are under development and require dispersants in most instances.

However, the conventional dispersants for dispersing fine powders in nonaqueous systems are not yet fully satisfactory in many cases from the dispersion stability viewpoint since they allow precipitation or separation of fine powder particles during long-term storage. Furthermore, while the conventional dispersants can give dispersion systems which are good and satisfactory as evaluated just after preparation thereof and, in some instances, can effectively reduce the viscosity of the systems, they can hardly prevent, in many instances, fine powder particles in said dispersion systems from precipitating and forming a hard and hardly redispersible precipitate, namely a hard cake. Generally, when the initial dispersibility is better, a harder cake tends to form.

On the other hand, pigments of practical use in various coating compositions, such as printing inks and paints, should be composed of fine particles so that they can have a high tinting power and give vivid color tones. Therefore, the step of dispersing fine powder pigments in nonaqueous organic liquids is an important step in the production of printing inks and paints. However, it is difficult to produce coloring material compositions excellent in flowability and storage stability by dispersing pigments in nonaqueous vehicles, in particular when the pigment concentration is high. It is known that problems are often encountered from the production process viewpoint and/or from the product quality viewpoint.

For example, dispersions containing a pigment composed of fine particles often have a high viscosity and cause remarkable viscosity increases in dispersing, stirring and mixing and during transfer and storage, for instance, and, in extreme cases, gel to such an extent that they are no longer usable. Furthermore, in mixed pigments, vehicle-pigment phase separation, precipitation, aggregation, and/or segregation may happen, leading, in some instances, to decreases in tinting power and/or luster and/or to poor leveling.

Coloring materials giving good coat films, such as printing inks and paints, contain finely dispersed pigments in high pigment concentrations. For the production of dispersions containing finely divided pigments in such high concentrations, it is necessary to loosen and unbind particles that have aggregated and at the same time maintain dispersion stability by using dispersants and/or the like.

For these purposes, various dispersants for pigments have heretofore been disclosed. However, none is fully satisfactory from the performance viewpoint as a dispersant for pigments. The dispersants for pigments as disclosed in Japanese Kokai Patent Publication No. 59-227951, for instance, are colored and therefore suited for use only with certain kinds of pigment. They can never serve as general-purpose dispersants. As other dispersants known for the above purposes, there may be mentioned polyesters derived from hydroxycarboxylic acids by dehydration condensation (Japanese Patent Publication No. 54-34009), reaction products from such polyesters and polyethylenimines (Japanese Patent Publication No. 63-30057), reaction products from such polyesters and polyoctamethylenepolyamines (Japanese Kokai Patent Publication No. 62-4433) and compounds derived from polyalkylenimine-epoxide reaction products by further reaction with polyesters (Japanese Kokai Patent Publication No. 63-12335), among others. However, although they exhibit dispersing effect for a short period in weakly polar organic liquids, such as aliphatic hydrocarbon fractions and aromatic hydrocarbons, they are inferior in long-term storage stability. They cannot produce any dispersing effect in highly polar liquids, such as alcohols.

SUMMARY OF THE INVENTION

Accordingly, it is an object of the invention to provide dispersants for nonaqueous systems which can disperse insoluble fine powders in nonaqueous dispersion media and thereby give dispersions having good dispersibility and long-term dispersion stability.

Another object of the invention is to provide dispersants for nonaqueous systems which are very efficient in dispersing, in particular, organic or inorganic pigments in various organic liquids to give stable dispersions while preventing pigment aggregation in said dispersions and without producing any adverse effect on the practical use of the dispersions because of their being uncolored.

The invention now provides dispersants for nonaqueous systems which comprise at least one polyether compound having an average molecular weight of 1,000 to 1,000,000 as derived from at least one member of the class consisting of polyamine compounds having 5 to 300 active hydrogen atoms per molecule, polyalkylenimine compounds having 5 to 300 active hydrogen atoms per molecule, and derivatives thereof having 5 to 300 active hydrogen atoms per molecule by addition of at least one of ethylene oxide and propylene oxide and at least one alpha-olefin oxide containing 4 to 30 carbon atoms.

The reason why the dispersants according to the invention can give excellent dispersibility and dispersion stability to dispersion systems comprising a variety of fine powder substances and a broad range of nonaqueous liquids may be considered to be as follows: The dispersants according to the invention have a high molecular weight and a bulky special molecular structure and, in addition, the particular constituent elements of the dispersants according to the invention, namely the strongly hydrophilic polyethyl ether chain and/or polypropyl ether chain and the strongly lipophilic or oleophilic polyether chain derived from the alpha-olefin oxide containing 4 to 30 carbon atoms, can be strongly adsorbed on fine powder particles, which constitute the dispersoid, in an well-balanced and efficient manner, so that a strong protective colloid action can be exerted on fine powder particles, promoting dispersion in the form of primary particles and potently preventing reaggregation.

DETAILED DESCRIPTION OF PREFERRED EMBODIMENTS

The dispersants according to the invention comprise at least one polyether compound derived from at least one member of the class consisting of polyamine compounds, polyalkylenimine compounds, and derivatives thereof by addition of specific alkylene oxides.

As the starting material to be used in the production of the dispersants according to the invention, there may be mentioned polyamine compounds having 5 to 300 active hydrogen atoms per molecule, polyalkylenimine compounds having 5 to 300 active hydrogen atoms per molecule, and derivatives of these containing 5 to 300 active hydrogen atoms per molecule. Said polyamine compounds include, among others, triethylenetetramine, tetraethylenepentamine, pentaethylenehexamine, tripropylenetetramine and the like polyalkylene polyamines. Said polyalkylenimine compounds include, among others, polyethylenimine and polypropylenimine. Said polyethylenimine is generally produced by polymerization of ethylenimine and has not an entirely linear structure but has a branched structure including primary, secondary and tertiary amino nitrogen atoms. However, any species, either linear or branched, or even a species containing a nitrogen-containing heterocycle or heterocycles may be used effectively provided that it contains 5 to 300 active hydrogen atoms per molecule. The above-mentioned polyamine compounds and polyalkylenimine compounds may be used as the staring materials in the form of derivatives thereof provided that said derivatives still contain 5 to 300 active hydrogen atoms per molecule.

As such derivatives, there may be mentioned, for example, reaction products from polyamines or polyalkylenimines and (a) aldehydes or ketones,
(b) alkyl halides,
(c) isocyanates or thioisocyanates,
(d) compounds having an active double bond,
(e) epihalohydrins,
(f) cyanamides, guanidines, ureas or the like, or
(g) carboxylic acids, acid anhydrides, acyl halides or the like.

The alkylene oxide adducts of these polyamine compounds, polyalkylenimine compounds, or derivatives thereof can be readily produced by using one or more of said compounds or derivatives as the starting materials and using a conventional method. Thus, for instance, the desired dispersants for nonaqueous systems can be produced by allowing alkylene oxides to add to the starting polyamine compounds and so forth at a temperature of 100° C. to 180° C. and a pressure of 1 to 10 atmospheres in the presence of an alkali catalyst.

It is necessary to combinedly use, as the alkylene oxides, at least one of ethylene oxide (hereinafter referred to as "EO") and propylene oxide (hereinafter referred to as "PO") for hydrophilic moiety formation and at least one alpha-olefin oxide (hereinafter referred to as "AOO") containing 4 to 30 carbon atoms for hydrophobic moiety formation.

The AOO may be in the form of a mixture of two or more differing in the number of carbon atoms. The AOO should preferably be added to the polyamine compounds and so forth in an amount, on the average, of 0.6 to 10 mole equivalents per active hydrogen atom. Out of the range mentioned above, no excellent dispersing effect may be produced in certain instances.

When an alpha-olefin oxide or oxides containing 8 to 30 carbon atoms are used as the AOO, it is preferable that the dispersants have a structure represented by the following general formula (1) or (2):

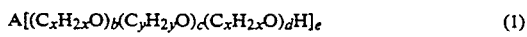  (1)

  (2)

In the above formulas, A is a residue derived from a polyamine compound, a polyalkylenimine compound, or a derivative thereof, containing e active hydrogen atoms by the removal of said active hydrogen atoms, x is an integer of 2 or 3, y is an integer of 8 to 30, b is an integer of 0 or 1 to 50, c is a variable integer of 0 or 1 to 10, with the average number of equivalents of $(C_yH_{2y}O)$ per molecule being $0.6e$ to $10e$, d is an integer of 1 to 50 and e is an integer of 5 to 300 and B is an oxyalkylene chain derived from EO and PO by block and/or random polymerization.

In cases where the dispersants have the above general formula (1) or (2), the order of addition of EO and/or PO and AOO is important for producing efficient dispersants.

In the case of dispersants of general formula (1), the preferred order of addition is, for example, as follows:
[1] (Starting material)-(AOO)-(EO or PO) or
[2] (Starting material)-(EO or PO)-(AOO)-(EO or PO).

Thus, for instance, an AOO is added to the starting material in an average amount of 0.6 to 10 mole equivalents per active hydrogen atom in the starting material, followed by further addition of 1 to 50 moles of EO or PO; or 1 to 50 moles, per active hydrogen atom in the starting material, of EO or PO is added to the starting material, followed by addition of an AOO in an average amount of 0.6 to 10 mole equivalents and by further addition of 1 to 50 moles of EO or PO.

The compounds of general formula (2) are produced by adding, to the AOO-adducts prepared as described above referring to the order of addition [1] or [2], a total of 2 to 100 moles, per active hydrogen atom in the starting material, of EO and PO in the manner of block or random polymerization. In this case, a block polymerization moiety or moieties and a random polymerization moiety or moieties may coexist. The block polymerization mode is preferred, however, with each block preferably having a degree of polymerization of not less than 5. Either an oxyethylene chain or an oxypropylene chain can effectively serve as the terminal of the compounds.

In cases where EO and butylene oxide (hereinafter referred to as "BO") are used as the alkylene oxides to be added to the starting materials, the number of moles of EO and BO added should preferably be 2 to 150 per active hydrogen atom of the polyamine compound and so forth. Either EO or BO may be added first. Either of block addition and random addition gives good results. The weight ratio between EO and BO added is generally 80/20 to 10/90 (EO/BO), preferably 70/30 to 20/80.

The polyether compounds, which are the dispersants according to the invention, have an average molecular weight of 1,000 to 1,000,000, preferably 5,000 to 800,000. When the average molecular weight is below 1,000, the dispersion stability may be insufficient.

Polyether derivatives derived from the polyether compounds obtained in the above manner by esterifying part or the whole of the terminal hydroxyl groups are also effective as dispersants for nonaqueous systems.

In that case, the polyether derivatives, namely esterification products, may be reaction products from the polyether compounds on one hand and, on the other, a dicarboxylic acid, such as adipic acid, phthalic acid, maleic acid or succinic acid, or an acid anhydride thereof or a polycarboxylic acid, or sulfate or phosphate esters derived from the polyether compounds by reacting with sulfuric acid, monochlorosulfonic acid, sulfuric anhydride (sulfur trioxide), phosphoric anhydride (phosphorus pentoxide) or the like in the conventional manner. These esterification products may be neutralized with an alkaline substance, such as sodium hydroxide, potassium hydroxide, calcium hydroxide or ammonium hydroxide or with an amine, such as an alkanolamine, a polyethylenepolyamine or an alkylamine.

In the dispersants for nonaqueous systems according to the invention, part or the whole of the nitrogen atoms thereof may be cationized or neutralized. For cationization, such cationizing agents as alkyl halides (e.g. methyl chloride, ethyl chloride, methyl bromide, ethyl iodide), dimethyl sulfate, diethyl sulfate, epichlorohydrin and benzyl chloride may be used. For neutralization, organic acids, such as acetic acid, oxalic acid, citric acid, lactic acid and malic acid, as well as inorganic acids, such as hydrochloric acid, nitric acid, sulfuric acid and phosphoric acid may be used. It is preferable, however, to use organic acid salts showing better dispersion stability in dispersion systems in nonaqueous liquids.

The dispersants according to the invention are used in an amount of 0.01 to 15% by weight, preferably 0.1 to 10% by weight, based on the whole dispersion system. In amounts below 0.01% by weight, their effect is too small while addition levels exceeding 15% by weight can hardly be expected to produce significant further improvements and are therefore disadvantageous from the economical viewpoint.

The dispersants according to the invention are effective in dispersing inorganic and organic fine powders. The fine powders are not limited to any particular species. As the inorganic finer powders, there may be mentioned, among others, silicates, such as kaolin, aluminum silicate, clay, talc, mica, asbestos powder, calcium silicate, sericite, bentonite, ultramarine, magnesium silicate, etc., carbonates, such as calcium carbonate, magnesium carbonate, barium carbonate, dolomite, etc., sulfates, such as calcium sulfate, barium sulfate, aluminum sulfate, etc., metal oxides, such as zirconia, magnesia, alumina, antimony trioxide, titanium oxide, white carbon, diatomaceous earth, iron oxide, zinc oxide, etc., hydroxides, such as aluminum hydroxide, iron hydroxide, etc., Prussian blue, silicon carbide, silicon nitride, boron nitride, barium titanate, carbon black, graphite, molybdenum disulfide, carbon fluoride, ceramic powders for sintering, carbon fiber powder, sulfur powder, magnetic powders, iron powder, aluminum powder, copper powder, nickel powder, silver powder, gold powder, coal dust, and so forth. As the organic fine powders, there may be mentioned colorant powders, such as insoluble azo pigments, azo disperse dyes, anthraquinone disperse dyes, indanthrene dyes, phthalocyanine pigments, lake pigments, perylene pigments, dioxazine pigments, quinacridone pigments, etc., powders of plastic resins, such as polyethylene resins, polystyrene resins, urethane resins, polyamide resins, acrylonitrile resins, Teflon resins, melamineisocyanurate resins, bakelite resins, etc., solid paraffins, agrochemicals, microbicides, antioxidants, ultraviolet absorbers flame retardants and so forth.

Among them, as pigments, there may be mentioned inorganic pigments, such as titanium dioxide, red and yellow iron oxides, barium sulfate, aluminum hydroxide, calcium carbonate, talc, clay, silica, lead chromate, zinc chromate, strontium chromate, carbon black, cadmium yellow, cadmium red, bloom red, black iron oxide, zinc white, Prussian blue, ultramarine, etc., as well as organic pigments, such as azo pigments, lakes, toners, phthalocyanine pigments, perylene pigments, perinone pigments, isoindolinone pigments, quinacridone pigments, dioxazine pigments, etc. The term "lakes" as used herein means water-insoluble salts or complexes of organic dyes as precipitated on water-insoluble inorganic carriers, such as alumina, and the term "toners" means water-insoluble or hardly water-soluble calcium, strontium or barium salts or complexes of azo dyes, in particular.

These fine powders should generally have an average particle size (diameter) of not more than 100 $\mu$m, preferably about 0.01 to 50 $\mu$m. When the fine powder is a pigment, a particle size of not more than 20 $\mu$m is generally preferred.

The concentration of fine powders in dispersion systems is not limited to any specific range if the dispersion systems can be obtained. In most instances, concentrations of 1 to 80% by weight are generally employed.

In the case of printing inks or paints, the dispersions may contain auxiliaries added thereto as necessary, for example thickeners, antisag agents, antisegregation agents, thixotropic agents, wetting agents, antifoams, rust inhibitors, slip agents, driers, ultraviolet absorbers, antifouling agents, preservatives, flame retardants and so forth.

As the nonaqueous liquids to serve as dispersion media for the above-mentioned fine powders, there may be mentioned, among others, aliphatic hydrocarbons, such as hexane, heptane, cyclohexane, mineral spirit, mineral terpene, liquid paraffins, machine oils, spindle oils, etc., aromatic hydrocarbons, such as benzene, toluene, xylene, etc., fuel oils, such as kerosene, light oil, heavy oil, etc., alcohols, such as methanol, ethanol, isopropanol, butanol, octanol, etc., esters, such as ethyl acetate, butyl acetate, amyl acetate, dioctyl phthalate, cellosolve acetate, etc., cellosolve species, such as ethylcellosolve, butylcellosolve, etc., ester oils, such as soybean oil, coconut oil, tallow oil, etc., halogenated hydrocarbons, such as chloroform, perchloroethylene, trichloroethylene, chlorobenzene, etc., ketones, such as methyl isobutyl ketone, methyl ethyl ketone, acetone, cyclohexanone, isophorone, etc., liquid polyhydric alcohols, such as ethylene glycol, propylene glycol, glycerol, polyethylene glycol, etc., liquid resins for paints, and so forth. These may be used either singly or in the form of a mixture of two ore more of them. The dispersion media may be mixture systems composed of these organic liquids and known resins, such as alkyd resins, epoxy resins, epoxy-ester resins, melamine resins, acrylic resins, polyamide resins, polyurethane resins, polyester resins, vinyl chloride resins, vinyl acetate resins, phenol resins, nitrocellulose resins, etc.

Where pigments are used as dispersoids, ketones, alcohols, cellosolve species and esters are preferred as organic liquids to serve as dispersion media.

For the production of dispersion systems using the dispersants according to the invention, any disperser may be used. Thus, for example, ball mills, sand mills, Visco-mills, three-roll dispersers, roll mills, kneaders, attriters, high-speed mixers, homomixers and the like may be employed.

The desired dispersing effect can be produced by adding, to the dispersoid, an organic liquid containing a dispersant according to the invention, by adding an organic liquid to a mixture of the dispersoid and a dispersant according to the invention or by adding a dispersant according to the invention to a dispersion composed of an organic liquid and the dispersoid.

The dispersants according to the invention may be used either singly or in combination with one or more other dispersants for nonaqueous systems, for example, polyoxyethylene nonylphenyl ether, sorbitan oleate, lecithin, polyoxyethylene octyl ether phosphate, calcium dodecylbenzenesulfonate, calcium petroleumsulfonate, fatty acid metal soaps, etc. Water may be added to the dispersion systems in small amounts not exceeding 5% by weight.

The dispersants according to the invention constructed, as mentioned above, by efficient and well-balanced addition of hydrophobic and hydrophilic alkylene oxides can disperse different kinds of fine powder in a short period of time in various nonaqueous liquids to thereby give dispersions showing good storage stability for a prolonged period of time. Thus, said dispersants can greatly contribute to the technical advancement in the field of nonaqueous system fine powder dispersion.

Particularly when the dispersants according to the invention are incorporated in surface coating compositions, for example when they are used sin the manufacture of nonaqueous paints or printing inks, the compositions can have a high tinting power, good flowability and high storage stability and can give good luster to paint films; said dispersants thus can contribute to quality improvements. In other words, mention may be made of such effects as flocculation-, flooding- and floating-preventing and leveling-improving effects produced by stabilization of the pigment dispersion state. The dispersants are particularly useful in the preparation of pigment dispersions for the manufacture of gravure printing inks. The term "pigment dispersions" means pigment-organic solvent-dispersant systems. Printing inks can be readily prepared by admixing these pigment dispersions with a desired vehicle depending on the intended use of said inks, so that the number of ink bases can be reduced drastically. Furthermore, such inks can be milled up within a short period even when the pigment concentration is much higher than in ordinary printing inks, and, therefore it becomes possible to save or reduce labor, electric power consumption, and running cost required for milling. In addition, even when the pigment concentration is increased, the dispersions can maintain good flowability, so that the costs of storage and transport can be reduced.

The following working examples and comparative examples are further illustrative of the present invention. It is to be noted, however, that they are by no means limitative of the scope of the invention.

Dispersants Nos. 1 to 14 (according to the invention) and dispersants Nos. 15 to 17 (for comparison)

The polyether compounds and derivatives thereof (dispersants) specified sin Table 1 were prepared from the starting materials and alkylene oxides specified in Table 1.

These dispersants were evaluated for their ability to give stable dispersions by the test method mentioned below. The test results thus obtained are shown below in Table 2 and Table 3.

Dispersion stability test

The specified amount of the insoluble fine powder indicated was added to 1 kg of the indicated nonaqueous liquid dispersion medium containing the specified amount of the dispersant to be tested. The resulting liquid mixture having a solid content of 10 to 40% by weight was milled in a bead mill for 30 minutes. The thus-obtained dispersion was placed in a graduated 1,000-ml cylinder and allowed to stand in a constant-temperature chamber maintained at 30° C. The dispersion state (evaluation item 1) was evaluated after the lapse of 1 day and 10 days and the hardness and redispersibility (evaluation item 2) of the precipitate were evaluated after 100 days of standing.

(1) Evaluation item 1

In dispersion state evaluation, whether the fine particles remained in the dispersed state in the dispersion without precipitation or not was judged according to the following criteria:
- ⊙: The powder was found wholly dispersed in the liquid and no precipitate was found on the cylinder bottom.
- ○: The powder was found mostly dispersed in the liquid and a slight amount of a precipitate was observed on the bottom.
- △: About half of the powder was found as a precipitate on the bottom.
- x: Most of the powder was found as a precipitate on the bottom.

(2) Evaluation item 2

In evaluating the hardness and redispersibility of the precipitate, the following criteria were used:
- ⊙: Upon stirring the liquid, the precipitate was dispersed readily.
- ○: The precipitate was soft and, upon stirring with a glass rod, could be readily redispersed.
- △: The precipitate was hard and could be redispersed only by vigorous stirring with a glass rod.
- x: The precipitate was very hard, so that even vigorous stirring failed to achieve redispersion.

TABLE 1

Polyether compounds and derivatives

| | | Starting material | Alkylene oxides added*1 | Molecular weight of polyether compound |
|---|---|---|---|---|
| Dispersant according to the invention | No. 1 | Triethylenetetramine | BO/EO (15/85) | 6,000 |
| | No. 2 | Pentaethylenehexamine | EO/BO (70/30) | 15,000 |
| | No. 3 | Polyethylenimine (10 N atoms) | EO/BO (20/80) | 53,000 |
| | No. 4 | Polyethylenimine (50 N atoms) | EO/BO (50/50) | 220,000 |
| | No. 5 | Polyethylenimine (180 N atoms) | EO/BO (60/40) | 780,000 |
| | No. 6 | Tetraethylenepentamine coco fatty acid monoamide | EO/BO (30/70) | 25,000 |
| | No. 7 | Polyethylenimine (30 N atoms) tallow fatty acid diamide | EO/BO (40/60) | 370,000 |
| | No. 8 | Pentaethylenehexamine-dodecylolefin epoxide (2 moles) adduct | EO/BO (30/70) | 12,000 |
| | No. 9 | Polyethylenimine (15 N atoms)-nonylphenol glycidyl ether (3 moles) adduct | EO/BO (40/60) | 65,000 |
| | No. 10 | Pentaethylenehexamine | EO/PO/BO (30/5/65) | 7,000 |
| | No. 11 | Polyethylenimine (25 N atoms) lauric acid diamide | EO/PO/BO (45/5/50) | 45,000 |
| | No. 12 | Sulfate ester monoethanolamine salt derived from dispersant No. 2 according to the invention | | |
| | No. 13 | Phosphate ester of dispersant No. 4 according to the invention | | |
| | No. 14 | Succinic acid diester of dispersant No. 6 according to the invention | | |
| Dispersants for comparison | No. 15 | Glycerin | PO/EO (70/30) | 4,000 |
| | No. 16 | Polyethylenimine (50 N atoms) | PO/EO (70/30) | 70,000 |
| | No. 17 | Tetraethylenepentamine-PO/EO (70/30) adduct polyether (molecular weight 12,000) lauric acid monoester | | |

*1: BO/EO, EO/BO, etc. indicate the order of alkylene oxide block addition to the starting materials; the ratio in the parentheses indicates the weight ratio between or among the alkylene oxides added.

TABLE 2

| | Dispersant | | Fine powder (dispersoid) | | Nonaqueous liquid (dispersion medium) | | Dispersion stability after | | |
|---|---|---|---|---|---|---|---|---|---|
| | Dispersant No. | Addition level (% by weight) | Name of fine powder | Quantity (% by weight) | Name of liquid | Quantity (% by weight) | 1 day | 10 days | 100 days |
| Examples | No. 1 | 2 | Carbon black (average grain size: 0.02 μm) | 10 | Mineral terpene | 88 | ⊙ | ○ | ○ |
| | No. 1 | 2 | Titanium oxide (average grain size: 0.2 μm) | 40 | Toluene | 58 | ⊙ | ○ | ○ |
| | No. 2 | 2 | Aluminum silicate (average grain size: 1 μm) | 30 | Kerosene | 68 | ⊙ | ⊙ | ⊙ |
| | No. 2 | 2 | Barium carbonate (average grain size: 4 μm) | 30 | Butanol | 68 | ⊙ | ⊙ | ⊙ |
| | No. 3 | 2 | Carbon black (average grain size: 0.02 μm) | 10 | Propylene glycol | 88 | ⊙ | ⊙ | ⊙ |
| | No. 3 | 2 | Titanium oxide (average grain size: 0.2 μm) | 40 | Methyl ethyl ketone | 58 | ⊙ | ⊙ | ⊙ |
| | No. 4 | 2 | Aluminum silicate (average grain size: 1 μm) | 30 | Dioctyl phthalate | 68 | ⊙ | ⊙ | ⊙ |
| | No. 4 | 2 | Barium carbonate (average grain size: 4 μm) | 30 | Mineral terpene | 68 | ⊙ | ⊙ | ⊙ |
| | No. 5 | 2 | Phthalocyanine blue (average grain size: 0.1 μm) | 20 | Toluene | 78 | ⊙ | ⊙ | ⊙ |
| | No. 5 | 2 | Anthrapurpurin dye (Alizarine A) (average grain size: 2 μm) | 20 | Toluene | 78 | ⊙ | ⊙ | ⊙ |
| | No. 6 | 2 | Carbon black (average grain size: 0.02 μm) | 10 | Butanol | 88 | ⊙ | ⊙ | ⊙ |
| | No. 6 | 2 | Graphite (average grain size: 5 μm) | 20 | Kerosene | 78 | ⊙ | ⊙ | ⊙ |
| | No. 7 | 2 | Titanium oxide (average grain size: 0.2 μm) | 40 | Butanol | 58 | ⊙ | ⊙ | ⊙ |
| | No. 7 | 2 | Aluminum silicate (average grain size: 1 μm) | 30 | Propylene glycol | 68 | ⊙ | ⊙ | ⊙ |
| | No. 8 | 2 | Barium carbonate (average grain size: 4 μm) | 30 | Methyl ethyl ketone | 68 | ⊙ | ⊙ | ⊙ |
| | No. 8 | 2 | Phthalocyanine blue (average grain size: 0.1 μm) | 20 | Dioctyl phthalate | 78 | ⊙ | ⊙ | ⊙ |

TABLE 3

| | Dispersant | | Fine powder (dispersoid) | | Nonaqueous liquid (dispersion medium) | | Dispersion stability after | | |
|---|---|---|---|---|---|---|---|---|---|
| | Dispersant No. | Addition level (% by weight) | Name of fine powder | Quantity (% by weight) | Name of liquid | Quantity (% by weight) | 1 day | 10 days | 100 days |
| Examples | No. 9 | 2 | Carbon black (average grain size: 0.02 μm) | 10 | Dioctyl phthalate | 88 | ⊙ | ⊙ | ⊙ |
| | No. 9 | 2 | Titanium oxide (average grain size: 0.2 μm) | 40 | Mineral terpene | 58 | ⊙ | ⊙ | ⊙ |
| | No. 10 | 3 | Aluminum silicate (average grain size: 1 μm) | 30 | Toluene | 67 | ⊙ | ⊙ | ⊙ |
| | No. 11 | 3 | Barium carbonate (average grain size: 4 μm) | 30 | Kerosene | 67 | ⊙ | ⊙ | ⊙ |
| | No. 12 | 2 | Phthalocyanine blue (average grain size: 0.1 μm) | 20 | Butanol | 78 | ⊙ | ⊙ | ⊙ |
| | No. 13 | 2 | Anthrapurpurin dye (Alizarine A) (average grain size: 2 μm) | 20 | Toluene | 78 | ⊙ | ⊙ | ⊙ |
| | No. 14 | 2 | Melamine isocyanurate resin (average grain size: 1 μm) | 20 | Mineral terpene | 78 | ⊙ | ⊙ | ⊙ |
| Comparative Examples | Sorbitan oleic acid ester | 3 | Carbon black (average grain size: 0.02 μm) | 10 | Toluene | 87 | x | x | x |
| | Potassium dodecylbenzenesulfonate | 3 | Aluminum silicate (average grain size: 1 μm) | 30 | Toluene | 67 | x | x | x |
| | Lauric acid diethanolamide | 3 | Anthrapurpurin dye (Alizarine A) (average grain size: 2 μm) | 20 | Toluene | 77 | x | x | x |
| | No. 15 | 3 | Melamine isocyanurate resin (average grain size: 1 μm) | 20 | Toluene | 77 | x | x | x |
| | No. 16 | 3 | Graphite (average grain size: 5 μm) | 20 | Mineral terpene | 77 | Δ | x | x |
| | No. 17 | 3 | Titanium oxide (average grain size: 0.2 μm) | 40 | Mineral terpene | 57 | x | x | x |
| | No. 17 | 3 | Aluminum silicate (average grain size: 1 μm) | 30 | Mineral terpene | 67 | x | x | x |
| | No addition | 0 | Barium carbonate (average grain size: 4 μm) | 30 | Mineral terpene | 67 | x | x | x |

Dispersants Nos. 18 to 34 (according to the invention) and dispersants Nos. 35 to 38 (for comparison)

The polyether polyol compounds (dispersants) specified in Table 4 were prepared from the starting materials and alkylene oxides specified in Table 4.

TABLE 4

| | | Polyether polyol compounds | | |
|---|---|---|---|---|
| | | Starting material | Alkylene oxides added *1 | Molecular weight of polyether polyol compound |
| Dispersant according to the invention | No. 18 | Pentaethylenehexamine | AOO-1/EO (0.9/6) | 3,700 |
| | No. 19 | Tetraethylenepentamine | AOO-1/PO (1.0/30) | 14,000 |
| | No. 20 | Polyethylenimine (MW = 600) | AOO-2/PO (3/15) | 23,000 |
| | No. 21 | Polyethylenimine (MW = 3,000) | AOO-2/PO (2/25) | 140,000 |
| | No. 22 | Polyethylenimine (MW = 1,200) | AOO-3/EO/PO (1.0/8/30) | 65,000 |
| | No. 23 | Polyethylenimine (MW = 1,200) | AOO-1/EO/PO (3.0/30/30) | 103,000 |
| | No. 24 | Polyethylenimine (MW = 1,200) | AOO-2/PO/EO (1.5/30/10) | 69,000 |
| | No. 25 | Polyethylenimine (MW = 1,200) | AOO-2/EO/PO/EO (1.0/10/30/5) | 75,000 |
| | No. 26 | Polyethylenimine (MW = 1,800) | AOO-2/PO/EO/PO (1.0/35/10/30) | 188,000 |
| | No. 27 | Polyethylenimine (MW = 1,800) | EO/AOO-2/PO (10/1.0/30) | 103,000 |
| | No. 28 | Polyethylenimine (MW = 1,800) | PO/AOO-2/PO (10/1.0/20) | 85,000 |
| | No. 29 | Polyethylenimine (MW = 1,800) | EO/AOO-2/PO (10/1.0/8) | 50,000 |
| | No. 30 | Polyethylenimine (MW = 3,000) | PO/AOO-2/PO/EO (15/1.0/30/10) | 233,000 |
| | No. 31 | Equimolar reaction product from polyethylenimine (MW = 1,800) and oleic acid | AOO-2/PO (1.0/25) | 71,000 |
| | No. 32 | Equimolar reaction product from polyethylenimine (MW = 1,800) and oleic acid | AOO-2/PO/EO (1.0/30/7) | 96,000 |
| | No. 33 | Equimolar reaction product from polyethylenimine (MW = 1,800) and oleic acid | EO/AOO-2/PO (10/1.5/20) | 83,000 |
| | No. 34 | Equimolar reaction product from polyethylenimine (MW = 1,800) and oleic acid | PO/AOO-2/EO (30/2.0/20) | 130,000 |

TABLE 4-continued

| | | Polyether polyol compounds | | |
|---|---|---|---|---|
| | | Starting material | Alkylene oxides added *1 | Molecular weight of polyether polyol compound |
| Dispersants for comparison | No. 35 | 12-Hydroxystearic acid dehydration condensate (acid value 35) | | |
| | No. 36 | Dehydration condensate from dispersant No. 35 (3 moles) and polyethylenimine (MW = 1,800; 1 mole) (acid value 1.0) | | |
| | No. 37 | Esterification product from dispersant No. 35 (5 moles) and polyethylenimine (MW = 600) - PO (10 moles) adduct (acid value 2.5) | | |
| | No. 38 | Pentaethylenehexamine-AOO-1 (10 moles) adduct | | |

*1: AOO-1/EO, AOO-1/PO, etc. indicate the order of block addition of alkylene oxides. The number of each alkylene oxide added per active hydrogen atom is given in the parentheses.
AOO-1: A 1:1 mixture of an alpha-olefin oxide containing 12 carbon atoms and an alpha-olefin oxide containing 14 carbon atoms; Daicel Chemical Industries' AOE ®-X24.
AOO-2: A 1:1 mixture of an alpha-olefin oxide containing 16 carbon atoms and an alpha-olefin oxide containing 18 carbon atoms; Daicel Chemical Industries' AOE ®-X68.
AOO-3: A mixture of alpha-olefin oxides containing 20 to 28 carbon atoms; Daicel Chemical Industries' AOE ®-Y08.

EXAMPLES 1 TO 8 AND COMPARATIVE EXAMPLE 1

The following dispersions were prepared using the dispersants specified sin Table 4 and the dispersants were evaluated for their performance in giving stable dispersions. In the following, "part(s)" means "part(s) by weight".

EXAMPLE 1

A mixture of 35 parts of carbon black (C.I. Pigment Black 7), 58 parts of n-butanol and 7 parts of dispersant No. 18 was shaken, together with 180 parts of steel balls having a diameter of 2 mm, in a paint shaker for 2 hours. The resulting dispersion, with the pigment satisfactorily deflocculated therein, had good flowability and was suited for use in the manufacture of gravure printing inks. Even after 45 days of standing, this dispersion showed neither aggregation nor precipitation and proved that it had good dispersion stability.

Dispersants Nos. 19 to 34 were used each in lieu of the above-mentioned dispersant No. 18. The dispersions obtained were similar in dispersion stability to the dispersion mentioned above.

EXAMPLE 2

A mixture of 30 parts of carbon black (C.I. Pigment Black 7), 40 parts of ethanol, 20 parts of toluene, 4 parts of a vinyl chloride-vinyl acetate copolymer resin and 6 parts of dispersant No. 21 was shaken, together with 180 parts of steel balls having a diameter of 2 mm, in a paint shaker for 3 hours. The resulting dispersion, with the pigment satisfactorily deflocculated therein, was suited for use in the manufacture of gravure printing inks. This dispersion showed neither aggregation nor precipitation even after 45 days of standing and thus proved that it had good dispersion stability.

Dispersants Nos. 18 to 20 and Nos. 22 to 34 were used each in lieu of the above-mentioned dispersant No. 21. The dispersions obtained were similar in dispersion stability to the dispersion mentioned above.

EXAMPLE 3

A mixture of 25 parts of Brilliant Carmine 6B (C.I. Pigment Red 57), 20 parts of methyl ethyl ketone, 40 parts of ethanol, 10 parts of butyl acetate and 5 parts of dispersant No,. 18 was shaken, together with 200 parts of steel balls having a diameter of b 2 mm, in a paint shaker for 2 hours. The resulting dispersion, with the pigment satisfactorily deflocculated therein, had good flowability and was suited for the manufacture of gravure printing inks. This dispersion showed neither aggregation nor precipitation even after 45 days of standing and thus proved that it had good dispersion stability.

Dispersants Nos. 19 to 34 were used each in lieu of the above-mentioned dispersant No. 18. The dispersions obtained showed similar good dispersion stability.

EXAMPLE 4

A mixture of 23 parts of phthalocyanine blue (C.I. Pigment Blue 15-4), 45 parts of ethanol, 22 parts of methyl isobutyl ketone, 5 parts of butyl acetate and 5 parts of dispersant No. 18 was shaken, together with 180 parts of steel balls having a diameter of 2 mm, in a paint shaker for 3 hours. The resulting dispersion, with the pigment satisfactorily deflocculated therein, was suited for use in the manufacture of gravure printing inks. This dispersion showed neither aggregation nor precipitation even after 45 days of standing and thus proved that it had good dispersion stability.

Dispersants No. 19 to 34 were used each in lieu of the above-mentioned dispersant No. 18. The dispersions obtained also showed good dispersion stability.

EXAMPLE 5

A mixture of 23 parts of Disazo Yellow AAA (C.I. Pigment Yellow 12), 40 parts of n-butanol, 30 parts of methyl ethyl ketone and 7 parts of dispersant No. 27 was shaken, together with 180 parts of steel balls having a diameter of 2 mm, in a paint shaker for 3 hours. The resulting dispersion, with the pigment satisfactorily deflocculated therein, was suited for use in the manufacture of gravure printing inks. This dispersion showed neither aggregation nor precipitation even after 45 days of standing and thus proved that it had good dispersion stability.

The following pigments were used each in lieu of Disazo Yellow AAA to give dispersions showing similar dispersion stability.

(1) Permanent Red 2B Barium (C.I. Pigment Red 48-1),
(2) Lake Red C (C.I. Pigment Red 53-1) and
(3) Dioxazine Violet (C.I. Pigment Violet 23).

EXAMPLE 6

A mixture of 65 parts of titanium oxide (C.I. Pigment White 6), 20 parts of ethanol, 12 parts of butyl acetate and 3 parts of dispersant No. 25 was shaken, together with 130 parts of steel balls having a diameter of 2 mm, in a paint shaker for 2 hours. The resulting dispersion, with the pigment satisfactorily deflocculated therein, had good flowability and was suited for use in the manufacture of gravure printing inks. This dispersion showed neither aggregation nor precipitation even after 30 days of standing and thus proved that it had good dispersion stability.

Zinc white (C.I. Pigment White 4), barium sulfate (C.I. Pigment White 21) or Prussian blue (C.I. Pigment Blue 27) was used in lieu of titanium oxide to give a dispersion having similar dispersion stability.

COMPARATIVE EXAMPLE 1

A mixture of 25 parts of carbon black (C.I. Pigment Black 7), 65 parts of n-butanol and 10 parts of Dispersant No. 35 was treated in the same manner as in Example 1. The mixture became a gel-like mixture immediately after shaking and failed to give a dispersion.

Dispersions Nos. 36 to 38 were used each in lieu of dispersant No. 35 to give a gel-like mixture. No dispersion was obtained in each case.

EXAMPLE 7

A mixture of 60 parts of bituminous coal (Daido coal) roughly crushed to a grain size not more than 0.5 mm, 39.5 parts of methanol and 0.5 part of dispersant No. 20 was processed, together with 50 parts of steel balls having a diameter of 3 mm and 50 parts of steel balls having a diameter of 10 mm, in a ball mill for 1 hour for finely dividing said bituminous coal. The resulting slurry-like dispersion had good flowability and was suited for use as a coal-methanol slurry coal. This dispersion showed neither aggregation nor hard cake precipitation even after 60 days of standing and thus proved that it had good dispersion stability.

Dispersants No. 21–34 were used each in lieu of the above-mentioned dispersant No. 20 to give dispersions having similar dispersion stability.

When the above-mentioned dispersants Nos. 35–38 were used, no dispersions were obtained.

EXAMPLE 8

A mixture of 40 parts of alumina having an average particle size of 0.5 μm, 55 parts of kerosene and 5 parts of dispersant No. 18 was stirred, together with 100 parts of steel balls having a diameter of 2 mm, in a laboratory disperser at 3,000 rpm for 10 minutes. The resulting dispersion had good flowability and was suited for use as a solid-mineral oil abrasive composition. The dispersion showed neither aggregation nor hard cake precipitation even after 100 days of standing and thus proved that it had good dispersion stability.

Silicon carbide, magnesium oxide or magnesium hydroxide was used in lieu of alumina to give a dispersion having similar dispersion stability.

Dispersants Nos. 19 to 34 were used each in lieu of the above-mentioned dispersant No. 18 to give dispersions each having similar dispersion stability.

The use of the above-mentioned dispersants Nos. 35 to 38 failed to give stable dispersions.

What is claimed is:

1. A dispersant for nonaqueous systems which consists essentially of at least one polyether compound derived from at least one member of the class consisting of polyamine compounds, polyalkylenimine compounds, and derivatives thereof, by addition of alkylene oxides, said dispersant being characterized in that said polyamine compounds, polyalkylenimine compounds, and derivatives thereof have 5 to 300 active hydrogen atoms per molecule and that said alkylene oxides include at least one of ethylene oxide and propylene oxide and at least one alpha-olefin oxide containing 12 to 28 carbon atoms, said polyether compound having an average molecular weight of 1,000 to 1,000,000.

2. A dispersant for nonaqueous systems as claimed in claim 1, said dispersant consisting essentially of at least one polyether compound of the general formula $$[(C_xH_{2x}O)_b(C_yH_{2y}O)_c(C_xH_{2x}O)_dH]_e$$

wherein A is a residue derived from a polyamine compound, a polyalkylenimine compound, or a derivative thereof, containing e active hydrogen atoms by the removal of said active hydrogen atoms, x is an integer of 2 or 3, y is an integer of 12 to 28, b is an integer of 0 or 1 to 50, c is a variable integer of 0 or 1 to 10, with the average number of equivalents of $(C_yH_{2y}O)$ per molecule being 0.6e to 10e, d is an integer of 1 to 50 and e is an integer of 5 to 300.

3. A dispersant for nonaqueous systems as claimed in claim 1, said dispersant consisting essentially of at least one polyether compound of the general formula $$A[(C_xH_{2x}O)_b(C_yH_{2y}O)_c(B)H]_e$$

wherein A is a residue derived from a polyamide compound, a polyalkylenimine compound, or a derivative thereof, containing e active hydrogen atoms by the removal of said active hydrogen atoms, x is an integer of 2 or 3, y is an integer of 12 to 28, b is an integer of 0 or 1 to 5u, c is a variable integer of 0 or 1 to 10, with the average number of equivalents of $(C_yH_{2y}O)$ per molecule being 0.6e to 10e, e is an integer of 5 to 300 and B is an oxyalkylene chain derived from ethylene oxide and propylene oxide by block and/or random polymerization thereof.

4. A dispersant for nonaqueous systems as claimed in claim 1, wherein said polyether compound has an oxyethylene chain or an oxypropylene chain at a terminal.

5. A polyether compound derived from at least one member of the class consisting of polyamine compounds, polyalkyleneimine compounds, and derivatives thereof, by addition of alkylene oxides, said polyether compound being characterized in that said polyamine compounds, polyalkyleneimine compounds, and derivatives thereof have 5 to 300 active hydrogen atoms per molecule and that said alkylene oxides include at least one of ethylene oxide and propylene oxide and at least one alpha-olefin oxide containing 12 to 28 carbon atoms, said polyether compound having an average molecular weight of 1,000 to 1,000,000.

6. A polyether compound of the general formula $$A[C_xH_{2x}O_b (C_yH_{2y}O)_c (C_xH_{2x}O)_dH]_e$$

wherein A is a residue derived from a polyamine compound, a polyalkylenimine compound, or a derivative thereof, containing e active hydrogen atoms by the removal of said active hydrogen atoms, x is an integer of 2 or 3, y is an integer of 12 to 28, b is an integer of 0 or 1 to 50, c is a variable integer of 0 or 1 to 10, with the average number of equivalents of $(C_yH_{2y}O)$ per molecule being 0.6e to 10e, d is an integer of 1 to 50 and e is an integer of 5 to 300.

7. A polyether compound of the general formula $$A[(C_xH_{2x}O)_b (C_yH_{2y}O)_c (B) H]_e$$

wherein A is a residue derived from a polyamine compound, a polyalkyleneimine compound, or a derivative thereof, containing e active hydrogen atoms by the removal of said active hydrogen atoms, x is an integer of 2 or 3, y is an integer of 12 to 28, b is an integer of 0 or 1 to 50, c is a variable integer of 0 or 1 to 10, with the average number of equivalents of ($C_yH_{2y}O$) per molecule being 0.6e to 10e, e is an integer of 5 to 300 and B is an oxyalkylene chain derived from ethylene oxide and propylene oxide by block and/or random polymerization thereof.

8. A polyether compound according to claim 5 having an oxyethylene chain or an oxypropylene chain at a terminal.

9. A dispersion comprising a nonaqueous liquid and dispersed therein a fine powder which is insoluble in said liquid, the dispersion further comprising, as a dispersant, a polyether compound according to claim 5.

10. A dispersion comprising a nonaqueous liquid and dispersed therein a fine powder which is insoluble in said liquid, the dispersion further comprising, as a dispersant, a polyether compound according to claim 6.

11. A dispersion comprising a nonaqueous liquid and dispersed therein a fine powder which is insoluble in said liquid, the dispersion further comprising, as a dispersant, a polyether compound according to claim 7.

12. A dispersion comprising a nonaqueous liquid and dispersed therein a fine powder which is insoluble in said liquid, the dispersion further comprising, as a dispersant, a polyether compound according to claim 8.

* * * * *